(12) United States Patent
Robison

(10) Patent No.: US 6,193,242 B1
(45) Date of Patent: *Feb. 27, 2001

(54) SNAP-IN CHUCK ASSEMBLY AND SNAP-IN TOOL

(75) Inventor: Troy Robison, Ingleside, IL (US)

(73) Assignees: Thomas R. Vigil, Barrington; Gary Sebastian, Lake Zurich, both of IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/522,229

(22) Filed: Mar. 9, 2000

Related U.S. Application Data

(63) Continuation-in-part of application No. 09/317,231, filed on May 24, 1999.

(51) Int. Cl.[7] .................... B23B 31/12; B23B 31/107; B23B 31/22

(52) U.S. Cl. ................ 279/137; 279/22; 279/62; 279/143; 279/902; 279/905; 279/71; 81/438; 408/226; 408/239 A; 408/240

(58) Field of Search ................... 279/143–145, 279/137, 22, 24, 30, 9.1, 71, 75, 902, 904, 905, 60–65; 81/125, 438, 439; 7/158, 165; 408/226, 239 A, 239 R, 240

(56) References Cited

U.S. PATENT DOCUMENTS

| | | | |
|---|---|---|---|
| D. 128,609 | * 8/1941 | Bakeman | 81/438 |
| 2,728,365 | 12/1955 | Austin . | |
| 2,807,473 | 9/1957 | Kiehne | 279/82 |
| 3,333,490 | * 8/1967 | Popin | 408/226 |
| 3,945,653 | 3/1976 | Falchle | 279/97 |
| 4,002,347 | * 1/1977 | Wanner et al. | 408/226 |
| 4,209,182 | 6/1980 | Sheldon | 279/75 |
| 4,234,277 | * 11/1980 | Benson et al. | 408/226 |
| 4,692,073 | 9/1987 | Martindell | 408/239 A |
| 5,421,682 | * 6/1995 | Obermeier et al. | 279/75 |
| 5,904,456 | * 5/1999 | Chern | 279/62 |
| 5,951,026 | 9/1999 | Harman, Jr. et al. | 279/143 |
| 5,975,815 | 11/1999 | Zierpka et al. | 408/226 |
| 5,984,596 | 11/1999 | Fehrle et al. | 408/226 |

FOREIGN PATENT DOCUMENTS

| | | | |
|---|---|---|---|
| 133442 | * 3/1948 | (AU) | 408/226 |
| 97/13602 | * 4/1997 | (WO) | 408/226 |

* cited by examiner

*Primary Examiner*—Steven C. Bishop
(74) *Attorney, Agent, or Firm*—Thomas R. Vigil

(57) ABSTRACT

The elongate rod shaped non-impact and non percussion drilling tool comprises: a non-impact and non-percussion drilling tool or implement formation at an outer end of the shank, a portion of the shank having a polygonal cross section at a location on the shank other than at an inner end of the shank, an annular groove in the shank which is only wide enough to receive a detent to prevent axial movement of the tool when it is received in a snap-in chuck assembly and a spline formation at an inner end of the shank. The chuck assembly includes either a polygonal drive structure in a center bore of the chuck assembly or a rotatable nose collar or an axially movable nose collar whereby a tool received in the center bore is held by friction in the polygonal drive structure or by a rotatable movement or an axial movement of the nose collar.

29 Claims, 5 Drawing Sheets

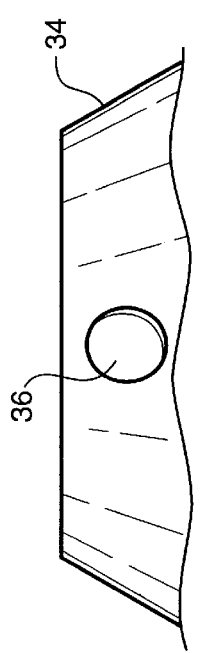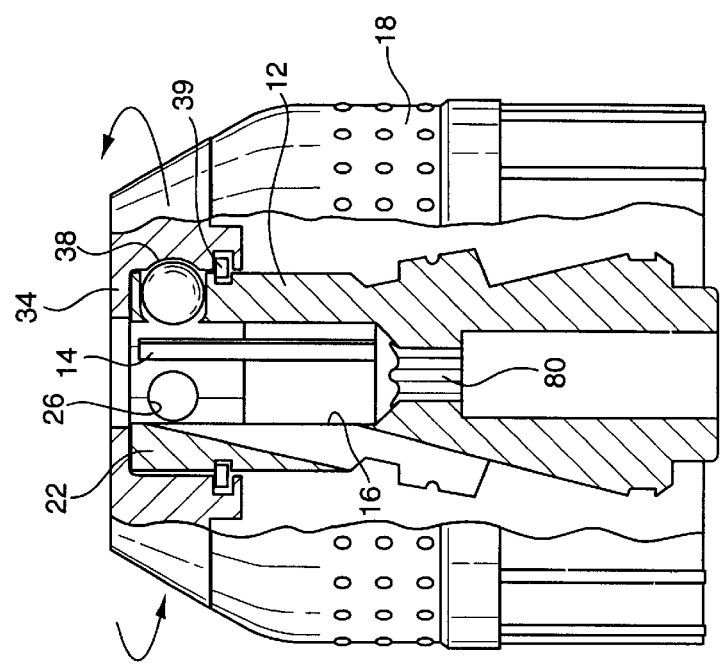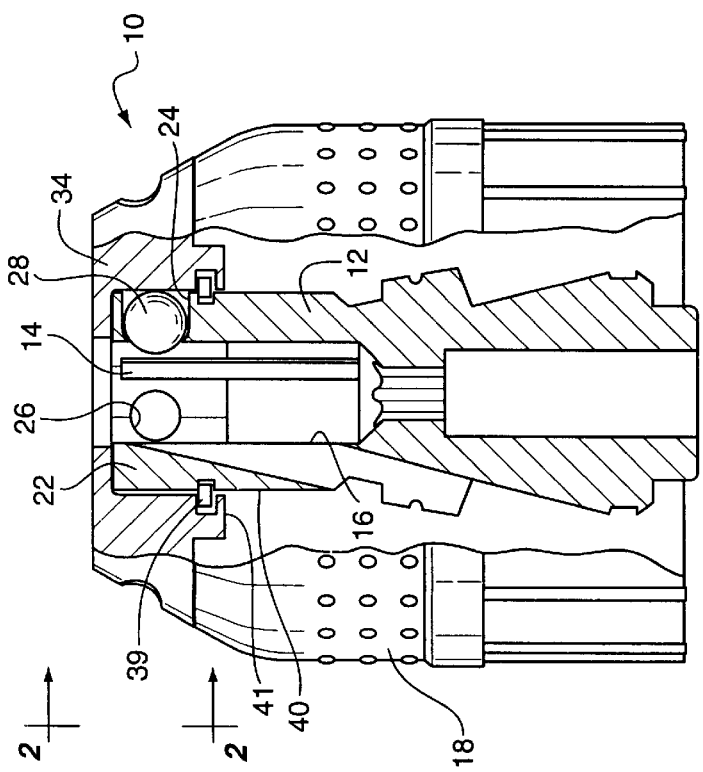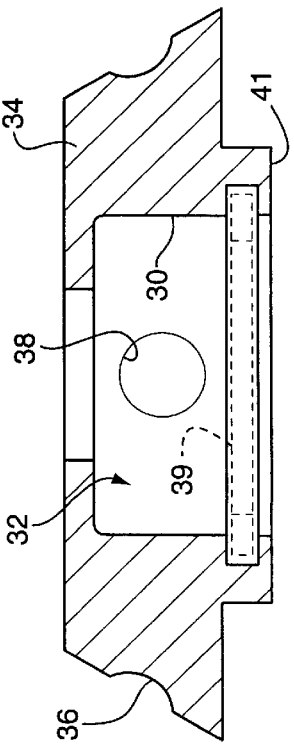

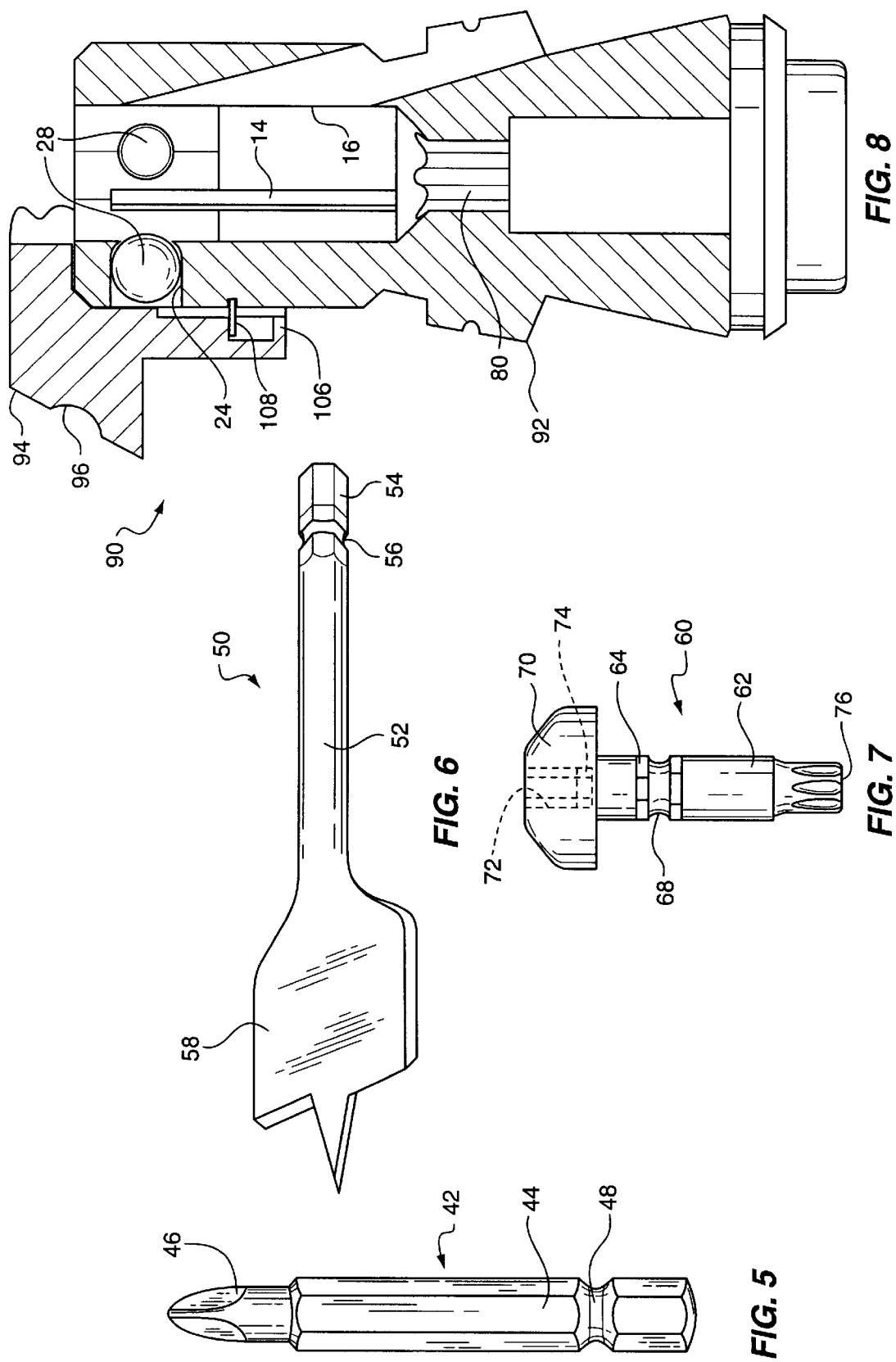

SNAP-IN CHUCK ASSEMBLY AND SNAP-IN TOOL

CROSS REFERENCE TO RELATED APPLICATIONS

This application is a continuation-in-part of U.S. application Ser. No. 09/317,231 filed May. 24, 1999 for SNAP-IN CHUCK, which is related to U.S. application Ser. No. 09/013,996 filed Jan. 27, 1999 for MAGNETIC CHUCK ASSEMBLY, now U.S. Pat. No. 5,921,562, issued Jul. 13, 1999.

BACKGROUND OF THE INVENTION

1. Field of the Invention

The present invention relates to a snap-in chuck assembly and a snap-in tool or tool holder for use in the snap-in chuck assembly. More specifically, the present invention is directed to a snap-in chuck assembly having an axially movable or rotatable nose for initiating or releasing gripping of a tool or tool holder received in the chuck assembly and is directed to a tool having a shank, a drill bit, a screwdriver, a Phillips screwdriver or other tool or implement formation at an outer end and a spline formation at an inner end of the shank.

2. Description of the Prior Art

Heretofore many tools for mounting in a chuck assembly have been proposed.

Examples of previously proposed analogous and non-analogous chuck assemblies and tools and tool holders are disclosed in the following analogous and non-analogous U.S. patents:

| U.S. Pat. No. | Patentee |
| --- | --- |
| 2,728,365 | Austin |
| 2,807,473 | Kiehne |
| 3,945,653 | Falche |
| 4,209,182 | Sheldon |
| 4,692,073 | Martindell |
| 5,921,562 | Robison |
| 5,951,026 | Harman, Jr. et al. |
| 5,984,596 | Fehrle et al. |
| 5,975,815 | Zierpka et al. |

SUMMARY OF THE INVENTION

According to the present invention there is provided a tool comprising a smooth shank, a tool or implement formation at an outer end of the shank and a spline formation at an inner end of the shank. In some embodiments the shank also has a polygonal, e.g., hexagonal, formation thereon and an annular groove in the shank which can be in the area of the polygonal formation.

Also, according to the present invention there is provided a chuck assembly comprising: a chuck body having an outer end portion, an outer periphery and a central bore extending at least partially through said chuck body along a central axis. The chuck body further has three, substantially equidistantly spaced, generally axially extending, jaw receiving slots which open onto the central bore and has mounting structure for mounting the chuck assembly onto the outer end of a shaft of a drive mechanism. Three axially and radially movable jaws are received in respective ones of the axially extending slots. A mechanism for moving the jaws against the shank of a tool or tool holder received in the central bore is provided. The chuck body has at least one inwardly extending passageway located in the chuck body between two of the axially extending slots and the passageway extends from the outer periphery of the chuck body inwardly to an opening which opens to the central bore. The opening has a diameter less than the diameter of the passageway and at least one detent is provided in the passageway. Structure for urging the at least one detent toward the central bore is provided together with a mechanism for releasing the engagement of the at least one detent against a shaft or shank received in the central bore. A nose collar is mounted on the outer end portion of the chuck body. Drive structure is provided in the central bore for engaging mating drive structure on the shank of a tool or tool holder received in the central bore of the chuck body, whereby the chuck assembly can impart a rotary drive to the tool or tool holder by reason of the mating engagement of the mating drive structures, and whereby axial movement of the shank of the tool or tool holder received in the central bore of the chuck body is inhibited, if not prevented, by the engagement of the jaws with the shank or by the engagement of the at least one detent with the shank received in the central bore or by both engagements.

In one embodiment, the nose collar is mounted for rotation and the urging structure comprises a cylindrical wall portion of a cylindrical cavity in the nose collar and the releasing mechanism comprises one or more cavities or pockets in the cylindrical wall portion which are constructed and arranged to be aligned with the at least one passageway containing the at least one detent so that, upon rotation of the nose collar, the at least one detent in the at least one passageway is allowed to move away from the opening and into one of the pockets.

In another embodiment, the nose collar is mounted for axial movement relative to the outer end portion of the chuck body and the urging structure comprises a first cylindrical wall portion of a cylindrical cavity in the nose collar having a diameter approximately the same diameter as the outer periphery of the outer end portion of the chuck body and the releasing mechanism comprises a second cylindrical wall portion having a diameter greater than the diameter of the outer periphery of the outer end portion, whereby axial movement of the nose collar will position the second cylindrical wall portion in the area of the at least one passageway to allow the at least one detent therein to move laterally outwardly away from the opening of the at least one passageway and into the central bore.

BRIEF DESCRIPTION OF THE DRAWINGS

FIG. 1 is a longitudinal side view with portions broken away of one embodiment of a chuck assembly constructed according to the teachings of the present invention.

FIG. 2 is a fragmentary side view of the chuck shown in FIG. 1 and is taken along line 2—2 of FIG. 1.

FIG. 3 is a longitudinal plan view of the chuck similar to the view shown in FIG. 1 but with an outer end portion or nose collar rotated 90°.

FIG. 4 is a sectional view of the nose collar shown in FIG. 3 and is taken along line 4—4 of FIG. 3.

FIG. 5 is a longitudinal plan view of one embodiment of a drill type tool constructed according to the teachings of the present invention.

FIG. 6 is a longitudinal plan view of another embodiment of a screwdriver type tool constructed according to the teachings of the present invention.

FIG. 7 is a longitudinal plan view of one embodiment of a tool holder constructed according to the teachings of the present invention.

FIG. 8 is a longitudinal sectional view through a modified chuck body of a second embodiment of a chuck assembly constructed according to the teachings of the present invention, and of half of a nose collar of the chuck assembly, which is used to move a locking detent (ball) radially inwardly and outwardly of a central hex bore of the chuck assembly and shows the collar holding the detent/ball in an inwardly locking position.

BRIEF DESCRIPTION OF THE PREFERRED EMBODIMENT(S)

Figure 10:
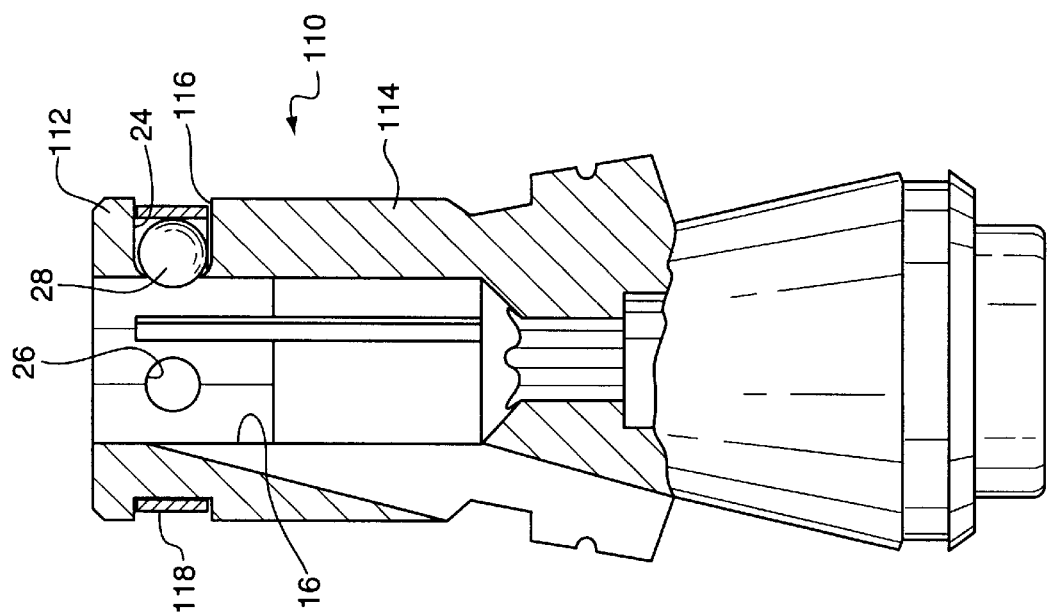
FIG. 10 is a longitudinal partially sectional view of a chuck body of a third embodiment of a chuck assembly constructed according to the teachings of the present invention and shows a detent/ball in a radially extending bore and an annular groove in the area of the radially extending bore and having a split collar spring based therein for biasing the detent/ball toward the central chuck bore.

Referring now to the drawings in greater detail, there is illustrated in FIG. 1 a longitudinal side view of one embodiment of the chuck assembly 10 constructed according to the teachings of the present invention. The chuck assembly 10 includes a chuck body 12 and at least three jaws 14, one of which is shown in FIG. 1, which are movable axially and radially relative to the chuck body 12 into and out of a central chuck hex bore 16. Mounted on the chuck body 12 is a sleeve 18 which is rotatable on the chuck body 12 for moving the jaws 14 in and out of the central bore 16.

The chuck body 12 includes an outer end portion 22 having at least one, and preferably three, transverse radial bores 24 therein which extend through the outer end portion 22 and opening onto the central bore 16 with a smaller opening 26 than the diameter of the radial bore 24. A ball 28, similar to a ball bearing, is received in each radial bore 24 and bears against an inner wall 30 of a cylindrical cavity 32 in a nose collar 34. To achieve this function, the outer end portion 22 most likely will have a reduced outer diameter such that the length of the radial bores 24 is less than the diameter of the ball 28 or a second ball or other spacing element is provided in each bore 24.

The hex cross-section of the central bore 16 can be limited to the area of the radial bores 24, as shown.

As shown in FIGS. 1, 2 and 4, the nose collar 34 has two spaced apart finger engaging concave pockets or dimples 36 to enable a user to grip the collar 34 and rotate it 90°.

The inner wall 30 of the cavity 32 in the nose collar 34, FIGS. 3 and 4, has three concave pockets 38 which are located rotationally 120° from each other and one is located 90° from one of the outer pockets 36 or in line with one of the outer pockets 36.

The outer end portion 22 further has a C-ring 39 mounted on an outer periphery 40 thereof for axially engaging an inwardly extending flange 41 of the nose collar 34, thereby to hold the nose collar 34 to the chuck body 12.

In use, one inserts the stem or shaft of a conventional tool or a specially constructed tool 42 (FIG. 5) into the central bore 16 and rotates the sleeve 18 to move the jaws 14 into engagement with the stem of the tool 42.

Alternatively, and in accordance with the teachings of the present invention, one can insert the specially configured tool 42 (FIG. 5) into the bore 16. Then a stem 44 of the tool 42 has a hex cross-section for mating with the central hex bore 16. The tool 42 has a Phillips head 46 and an annular groove 48 which can be moved into alignment with the balls 28 when the nose collar 34 is in the position shown in FIG. 3 where each ball 28 is in line radially within one the radial bores 24 between the opening 26 to the central hex bore 16 and the pocket 38 in the wall 30.

This allows a tool, such as the tool 42, to be axially inserted into the central bore 16 past the balls 28 until the balls 28 are in radial alignment with the annular groove 48. At this point, a user can rotate the nose collar 34 to move the pockets 38 away from the balls 28, thereby to move the surface of the cylindrical wall 30 against the balls 28 urging them toward and into the opening 26 to the central bore 16.

Then, to remove the tool, such as a tool 42, from the central hex bore 16 of the chuck body 12, a user will grip the nose collar 34 with his/her finger and thumb received in the pockets 36 and rotate the nose collar 90° until the pockets 38 on the inner wall 30 of the cavity 32 are aligned with the radial bores 24 so that when one pulls on the tool 42 the balls 28 can move inwardly in the radial bores 28 and into the pockets 38 so that the tool 42 can be removed axially from the central chuck bore 16.

The tool 42 illustrated in FIG. 5 includes the hex in cross-section shank or stem 44, the Phillips head 46 and the annular groove 48 in the hex in cross-section shank or stem 44.

It will be understood that other types of tool heads, such as a drill tool head or a straight screwdriver tool head can be provided on the tool 42 in place of the Phillips screwdriver head 46.

In FIG. 6 is illustrated another tool 50 having a middle stem portion 52, a hex in-cross-section inner end 54 with an annular groove 56 therein, and a special drill head or spade bit 58 for drilling larger holes than the diameter of the stem portion 52.

In FIG. 7 is illustrated a tool holder 60 which can be of the type disclosed in the Robison U.S. Pat. No. 5,921,562.

The tool holder 60 has a middle stem portion 62 which is different than the stem disclosed in U.S. Pat. No. 5,921,562. In this respect, the stem portion 62 is modified to have a hex in-cross-section area 64 with an annular groove 68 in the hex in-cross-section area 64, whereby the tool holder 60 is adapted to be received in the central hex bore 16 and axially locked therein by balls 28 received in the annular groove 68 and fixed against rotation in the bore by the engagement of the hex in-cross-section area 64 with the hex cross-section central bore 16.

The tool holder 60 further has a mushroom head 70 with a cavity 72 for receiving a tool and a magnet 74 at the bottom of the cavity 72 for releasably holding a tool in the cavity 72. The tool holder 60 further includes an inner end 76 which has a spline configuration 78 for being received in a spline section 80 of the central bore 16. The spline section 80 of the central bore 16 can be of the type disclosed in the Salpaka U.S. Pat. No. 5,193,824, the disclosure of which is incorporated herein by reference.

Figure 9:
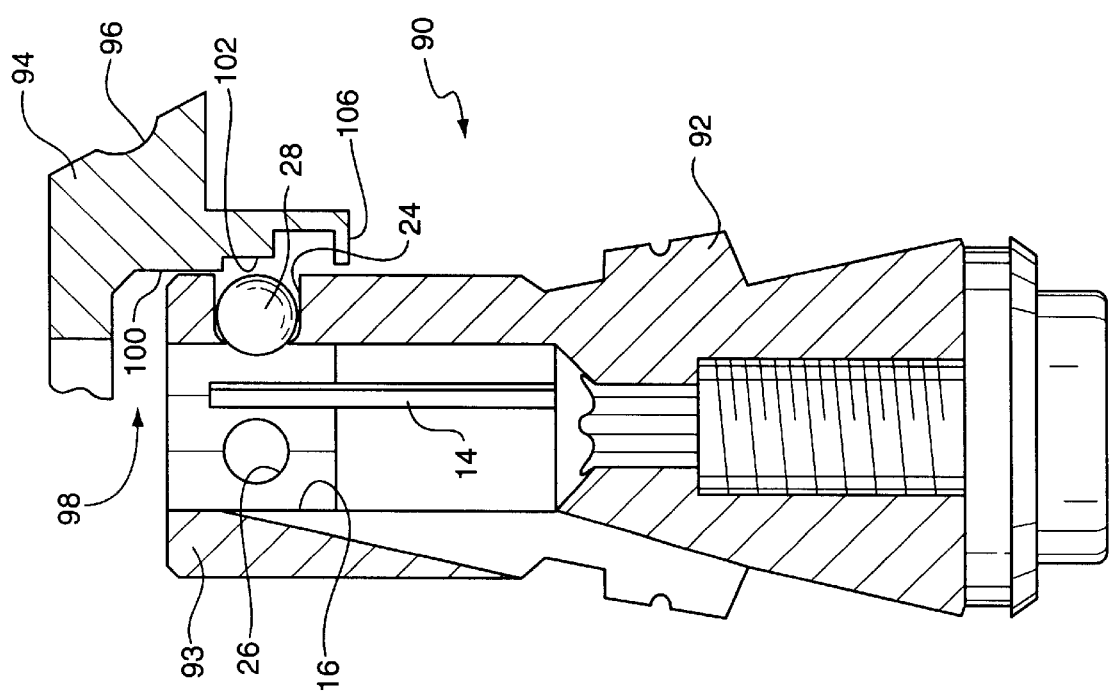
FIG. 9 is a longitudinal sectional view of the chuck body shown in FIG. 9 and shows the nose collar moved axially outwardly for placing the detent/ball in a nonrestrained position where the detent/ball can move radially outwardly from a central hex bore.

In FIGS. 8 and 9 there is illustrated a second embodiment of a chuck assembly 90 constructed according to the teachings of the present invention wherein the construction of the chuck body 92 is identical to the construction of the chuck body 12 shown in FIGS. 3 and 4 with an outer end portion 93. However, in this embodiment, a nose collar 94 is constructed for axial movement as opposed to rotational movement. In this respect, as shown in FIG. 8, the nose collar 94 has at least two dimple concave pockets or dimples 96 on the outer surface thereof to enable one to grip the nose collar 94 and pull it or push it to move the nose collar 94 axially of the chuck assembly 90. Then, the interior of the nose collar 94 has a stepped cavity 98 including a first cylindrical portion 100 which has a diameter which will fictionally engage the ball or balls 28 in the radial bores 24 for urging them into and partially through the opening 26 of each radial bore 24 that opens to the central chuck bore 16. Then, the cavity 98 has a stepped, larger cylindrical portion 102 located inwardly of the cylindrical wall portion 100.

In use, and as shown in FIG. 9, when one grips the nose collar 94 and pulls it outwardly, the larger-in-diametercylindrical wall portion 102 of the cavity 98 is radially aligned with the ball or balls 28 in each radial bore 24 so that they can move radially outwardly from the opening 26 that opens to the central bore 16, thereby to allow a tool to be inserted or removed from the hex in-cross-section central bore 16.

The nose collar 94 has a lower annular flange 106 for engaging a ring 108 mounted on the outer end portion 93 of the chuck body 92 for holding the nose collar on the outer end portion 93 and for limiting axial movement of the nose collar 94.

It is to be noted that the outer portion 93 of the chuck body 92 can have a reduced-in-diameter outer surface to provide a length of each radial bore 24 which is less than the diameter of the ball 28 so that a friction engagement between the balls 28 and the cylindrical wall portion 100 of the cavity 98 can be established.

In FIG. 10 there is illustrated a third embodiment of a portion of a chuck assembly 110 constructed according to the teachings of the present invention. In this embodiment, the outer end portion 112 of a chuck body 114 has an annular groove 116 therein in the area of the radial bores 24 so that a C or split ring or band 118 can be received in the annular groove 116 for engaging the radially outwardly facing side of each of the three detents or balls 28 for urging each of them into one of the openings 26 at the inner end of each of the radial bores 24. In this embodiment, the outer end portion 112 of the chuck body 114 does not have a reduced-in-diameter relative to the rest of the chuck body 114. Further, in this embodiment, when a tool is inserted into the hex bore 16, pressure must be applied to move the balls 28 radially outwardly against the pressure of the spring band 118 to enable the tool to be inserted into the central hex cross-section bore 16 of the chuck body 114. Likewise, when removing the tool from the hex bore 16, one must exert a pulling force to force the balls 28 against the spring band 118 to effect removal of the tool from the hex bore 16.

Figure 11:
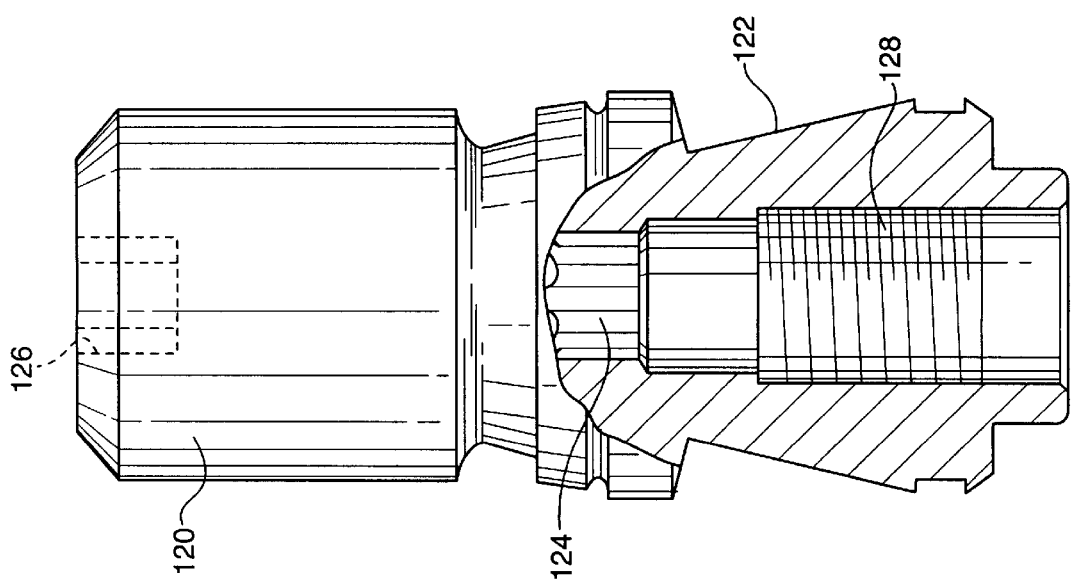
FIG. 11 is a longitudinal side view of a chuck body for one of the embodiments of the chuck assembly disclosed herein with an inner or lower portion broken away to show a spline area of the central chuck bore and a threaded area of the chuck bore.

The outer periphery 120 of a chuck body 122 is illustrated in FIG. 11 with the bottom portion cut away to show a spline section 124 of a central hex bore 126 and an inner threaded section 128 of the chuck bore 126 for enabling the chuck body 122 to be mounted on a threaded end of a power tool as disclosed in the Salpaka U.S. Pat. No. 5,193,824.

Figure 12:
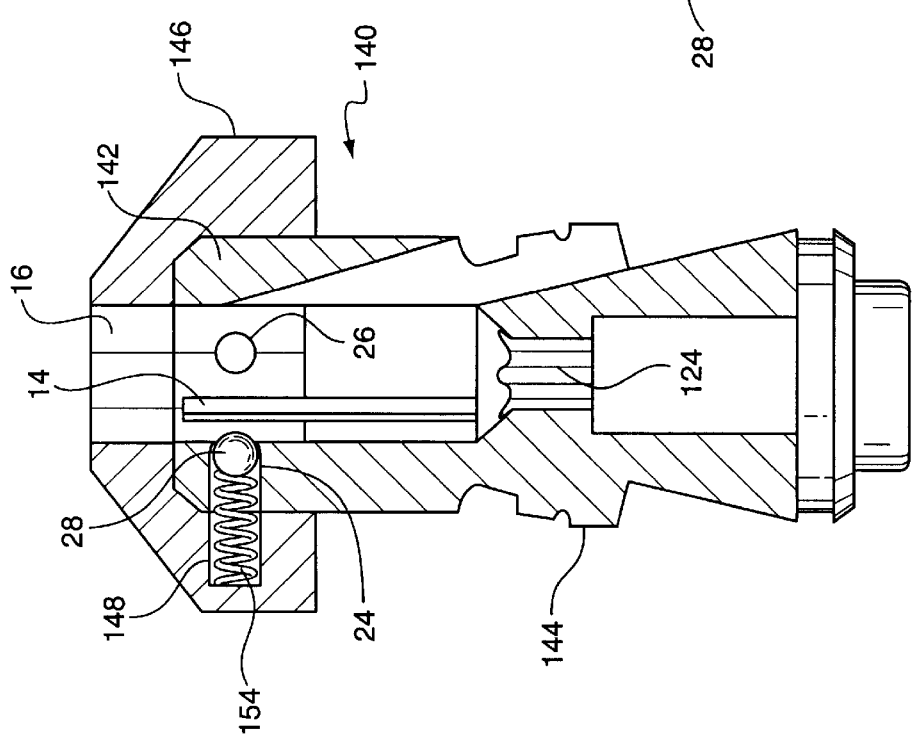
FIG. 12 is a longitudinal sectional view of a fourth embodiment of the chuck assembly of the present invention and shows a nose collar on a chuck body similar to the chuck body shown in FIG. 10 with lateral bores in the nose collar adapted to be aligned with radially extending bores in the chuck body.

In FIG. 12 there is illustrated a fourth embodiment of a chuck assembly 140 constructed according to the teachings of the present invention. In this embodiment, the outer end portion 142 of the chuck body 144 does not have a reduced-in-diameter relative to the remainder of the chuck body 144 and does not have any annular slot in the chuck body 144 in the area of the balls 28. Instead, a nose collar 146 is provided with three radial bores 148 which extend inwardly from and are equally spaced around a cylindrical wall 150 of a cavity 152 in the nose collar 146. Then, a spring 154 is inserted into each one of these three bores 148 and the nose collar 146 is moved axially over the outer end portion 142 of the chuck body 144 until the bores 148 with the springs 154 therein are in alignment with the bores 24 having the balls 28 therein, at which point the compressed springs 154 will move one of the bores 148 into the radial bores 24 to engage and bear against the back side of each one of or the back one of a pair of the balls 28 in each radial bore 24.

It will be understood that suitable alignment means, such as for example, matting axially extending slots in, and a key between, the outer end portion 142 of the chuck body 144 and the cylindrical wall 150 of the cavity 152 in the nose collar 146 is provided for ensuring proper alignment of the nose collar 146 with the chuck body 144 and locking of the nose collar 146 against rotation relative to the chuck body 144.

Figure 13:
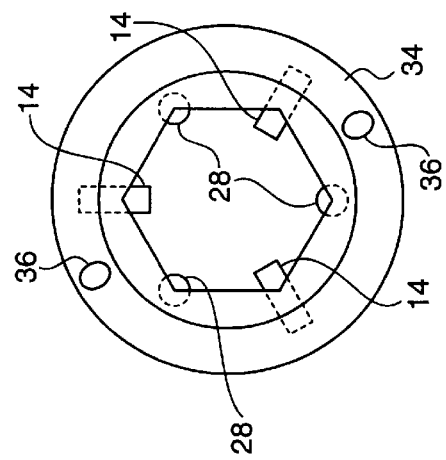
FIG. 13 is an end view of the chuck body of each of the four embodiments and shows three jaws at three corners of the hex bore and three detents/balls at the other three corners of the hex bore between the jaws.

FIG. 13 is an end view of one of the nose collars, e.g. nose collar 34, shown in FIGS. 1, 3, 8, 9 and 12 showing the hex in-cross-section central bore 16 with jaws 14 located at alternate ones of the hex corners of the bore 16 and with balls 28 at the adjacent alternate corners of the hex bore 16.

Figure 14:
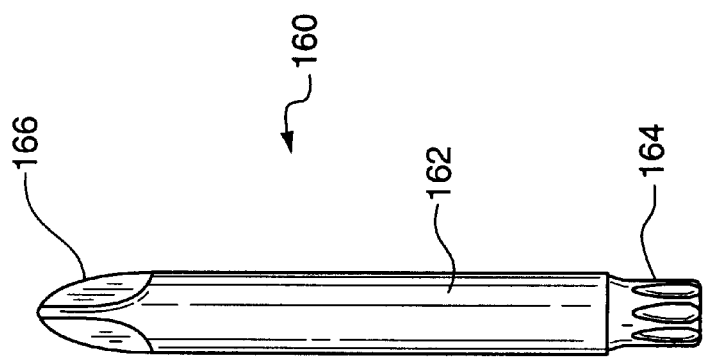
FIG. 14 is a plan view of a tool constructed according to the teachings of the present invention which has a smooth shank with a spline formation at an inner end thereof.

In FIG. 14 there is illustrated a tool 160 constructed according to the teachings of the present invention. The tool 160 is a simplified tool which has a smooth shank 162, a spline configuration 164 at an inner end thereof, a tool formation 166 such as a Phillips screwdriver formation at an outer end thereof. This tool 160 is adapted to be simply and quickly inserted into one of the chuck assemblies described above and is rotatably driven by the spline formation 124 engaging with the spline formation 164 at the inner end of the shank 162 while three spring biased balls 28 in one of the chuck assemblies bears against the smooth shank 162 and the friction between the balls 28 and the smooth shank 162 provides a holding force, although minimal, against axial movement of the tool 160 in one of the chuck assembles described above.

Figure 15:
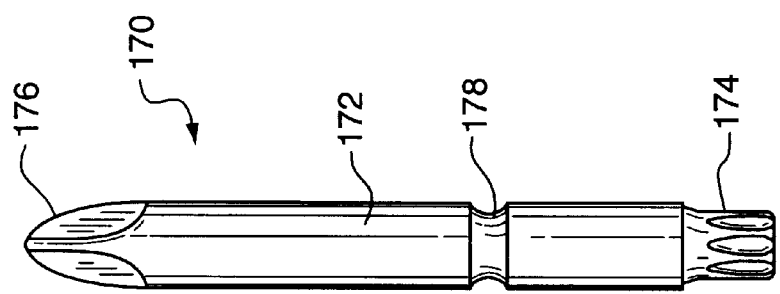
FIG. 15 is a plan view of a tool constructed according to the teachings of the present invention which has a smooth shank with an annular groove therein and a spline formation at an inner end thereof.

To provide a stronger restraining force against axil movement of a tool, a tool 170 can be provided, as shown in FIG. 15, which has a shank 172, a spline formation 174 at an inner end of the shank 172, a tool formation 176 at an outer end thereof and an annular groove 178 for receiving one or more balls 28.

Figure 16:
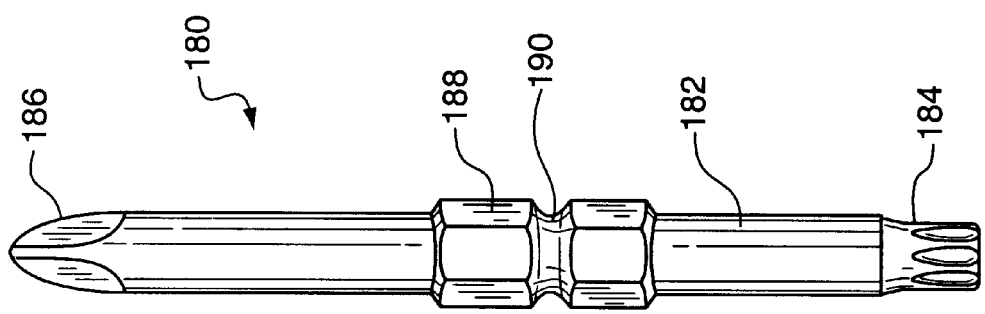
FIG. 16 is a plan view of another tool constructed according to the teachings of the present invention which has a shank with a hexagonal portion, an annular groove in the shank in the area of the hexagonal portion and a spline formation at an inner end thereof.

When it is desired to provide a strong rotary drive between a tool and one of the chuck assemblies described above and the tool, as well as an axial straining force against axial movement of the tool relative to one of the chuck assemblies described above, a tool 180, as shown in FIG. 16, is provided. As shown, the tool 180 includes a shank portion 182, a spline formation 184 at an inner end thereof and a tool formation 186 at an upper end thereof. In addition, formed on the shank is a polygonal, preferably hexagonal, formation 188 which engages a mating configuration, e.g. the hex bore 16 shown in FIGS. 1, 10 and 12, and an annular groove 190 in the shank 182 in the area of the hexagonal formation 188.

It will be understood that the tool 160,170 or 180, as well as the tools 42 and 50 and the tool holder 60 can be used with any of the chuck assemblies described above and that each tool 160,170 and 180, as well as the tools 42 and 60 and the tool holder 60 have advantages therein as described above. In particular, the tool 160 provides a very simple tool which can be pushed either in or out of one of the chuck assemblies described above and minimally held therein against axial movement in the chuck assembly. If movement of the tool 160 is encountered, the user can simply rotate an outer sleeve of the chuck assembly to bring the jaws into engagement with the shank 162, in addition to engagement of the balls or detents 28 with the shank 162.

Alternatively, if a very strong retention against axial movement of the tool is desired or required, the tool 170 or 180 can be used which can be easily and simply inserted into the conventional chuck having the balls or detents 28 mounted therein, as described above, with engagement of the balls 28 in the annular groove 178 or 190 to prevent axial movement of the tool 170 180.

For a stronger rotary drive the tool 180 with polygonal, hexagonal formation 188 and the spline formation 184 can be used with one of the chuck assemblies described above.

Additionally, the chuck assembly 10 or 90 can be used with the rotatable nose collar 34 or the axially movable nose collar 94 for locking or unlocking one or more of the balls 28 against the shank 44, 52, 62, 162, 172, or 182.

From the foregoing description, it will be understood that the chuck assemblies 10 or 90 and the tools 42, 50, 160, 170 or 180 or tool holder 60 of the present invention have a number of advantages, some of which have been described above and others of which are inherent in the invention. Additionally, it will be noted that modifications can be made to the chuck assemblies or tools the present invention without departing from the teachings of the present invention. Accordingly, the scope of the invention is only to be limited as necessitated by the accompanying claims.

I claim:

1. An elongate rod shaped, non-impact and non percussion drilling, rotary tool comprising a shank, a non-impact and non-percussion drilling, rotary tool or implement formation at an outer end of said shank, a portion of said shank having a polygonal cross section at a location on said shank other than at an inner end of said shank, an annular groove in said shank which is only wide enough to receive a detent to prevent axial movement of said tool when it is received in a snap-in chuck assembly and a spline formation at an inner end of said shank.

2. The tool of claim 1 wherein said annular groove is located in said portion having said polygonal cross section.

3. The tool of claim 1 wherein said tool formation of said tool is selected from the group comprising: a drill bit, a screwdriver, and a Phillips screwdriver.

4. The tool of claim 1 wherein said inner end of said shank having said spline formation has a smaller diameter than the diameter of said shank.

5. A chuck assembly comprising:
   a chuck body having an outer end portion, an outer periphery and a central bore extending at least partially through said chuck body along a central axis;
   said chuck body further having three, substantially equidistantly spaced, generally axially extending, jaw receiving slots which open onto said central bore;
   mounting means for mounting said chuck assembly onto the outer end of a shaft of a drive mechanism;
   three axially and radially movable jaws received in respective ones of said axially extending slots;
   moving means for moving said jaws against the shank of a tool or tool holder received in said central bore;
   said chuck body having at least one inwardly extending passageway located in said chuck body between two of said axially extending slots, said passageway extending from said outer periphery of said chuck body inwardly to an opening which opens to said central bore;
   said opening having a diameter less than the diameter of said passageway;
   at least one detent in said passageway;
   urging means for urging said at least one detent toward said central bore;
   means for releasing the engagement of said at least one detent against a shaft or shank received in said central bore;
   a nose collar mounted for rotation on said outer end portion of said chuck body and said urging means comprises a cylindrical wall portion of a cylindrical cavity in said nose collar and said releasing means comprises one or more cavities or pockets in said cylindrical wall portion constructed and arranged to be aligned with said at least one passageway containing said at least one detent so that, upon rotation of said nose collar, said at least one detent in said at least one passageway is allowed to move away from said opening and into one of said pockets;
   and drive structure in said central bore for engaging mating drive structure on the shank of a tool or tool holder received in said central bore of said chuck body;
   whereby said chuck assembly can impart a rotary drive to the tool or tool holder by reason of the mating engagement of the mating drive structures;
   and whereby axial movement of the shank of the tool or tool holder received in said central bore of said chuck body is inhibited, if not prevented, by the engagement of said jaws with the shank or by the engagement of said at least one detent with the shank received in said central bore or by both engagements.

6. The chuck assembly of claim 5 wherein said means for mounting said chuck body to the outer end of a drive shaft of a powered drive mechanism comprises a threaded portion at the inner end of said central bore for mating with a threaded outer end of a drive shaft.

7. The chuck assembly of claim 5 wherein said outer end portion has at least three equidistantly spaced passageways therein.

8. The chuck assembly of claim 5 wherein said central bore has a hex cross section at least in the area of said at least one passageway said outer end portion of said chuck body, said hex bore defining said means in said central bore for engaging a tool shank and preventing rotation of the tool shank relative to said chuck body.

9. The chuck assembly of claim 5 wherein said central bore has an inner spline section defining said means in said central bore for engaging a spline configuration on a tool shank and preventing rotation of the tool shank relative to said chuck body.

10. The chuck assembly of claim 5 wherein said nose collar has finger receiving pockets for enabling one to grasp said nose collar and rotate said nose collar about the axis of said central bore.

11. The chuck assembly of claim 5 combined with a tool or tool holder having a mating drive structure on a shank thereof.

12. The chuck assembly and tool or tool holder of claim 11 wherein said shank of said tool or tool holder has an annular groove therein for receiving said at least one detent for holding said shank of said tool or tool holder against axial movement.

13. The chuck assembly of claim 5 combined with a tool or tool holder having a polygonal drive structure on a shank thereof for mating with a polygonal drive structure in said central bore.

14. The chuck assembly of claim 5 combined with a tool or tool holder having a spline drive structure on a shank thereof at an inner end of said shank for mating with a spline drive structure in said central bore.

15. A chuck assembly comprising:
a chuck body having an outer end portion, an outer periphery and a central bore extending at least partially through said chuck body along a central axis;
said chuck body further having three, substantially equidistantly spaced, generally axially extending, jaw receiving slots which open onto said central bore;
mounting means for mounting said chuck assembly onto the outer end of a shaft of a drive mechanism;
three axially and radially movable jaws received in respective ones of said axially extending slots;
moving means for moving said jaws against the shank of a tool or tool holder received in said central bore;
said chuck body having at least one inwardly extending passageway located in said chuck body between two of said axially extending slots, said passageway extending from said outer periphery of said chuck body inwardly to an opening which opens to said central bore;
said opening having a diameter less than the diameter of said passageway;
at least one detent in said passageway;
urging means for urging said at least one detent toward said central bore;
means for releasing the engagement of said at least one detent against a shaft or shank received in said central bore;
a nose collar being mounted on said outer end portion of said chuck body for axial movement relative to said outer end portion of said chuck body and said urging means comprising a first cylindrical wall portion of a cylindrical cavity in said nose collar having a diameter approximately the same diameter as said outer periphery of said outer end portion of said chuck body and said releasing means comprising a second cylindrical wall portion having a diameter greater than the diameter of said outer periphery of said outer end portion, whereby axial movement of said nose collar will position said second cylindrical wall portion in the area of said at least one passageway to allow said at least one detent therein to move laterally outwardly away from said opening of said at least one passageway and into said central bore;
and drive structure in said central bore for engaging mating drive structure on the shank of a tool or tool holder received in said central bore of said chuck body;
whereby said chuck assembly can impart a rotary drive to the tool or tool holder by reason of the mating engagement of the mating drive structures;
and whereby axial movement of the shank of the tool or tool holder received in said central bore of said chuck body is inhibited, if not prevented, by the engagement of said jaws with the shank or by the engagement of said at least one detent with the shank received in said central bore or by both engagements.

16. The chuck assembly of claim 15 wherein said means for mounting said chuck body to the outer end of a drive shaft of a powered drive mechanism comprises a threaded portion at the inner end of said central bore for mating with a threaded outer end of a drive shaft.

17. The chuck assembly of claim 15 wherein said outer end portion has at least three equidistantly spaced passageways therein.

18. The chuck assembly of claim 15 wherein said central bore has a hex cross section at least in the area of said at least one passageway in said outer end portion of said chuck body, said hex bore defining said means in said central bore for engaging a tool shank and preventing rotation of the tool shank relative to said chuck body.

19. The chuck assembly of claim 15 wherein said central bore has an inner spline section defining said means in said central bore for engaging a spline configuration on a tool shank and preventing rotation of the tool shank relative to said chuck body.

20. The chuck assembly of claim 15 wherein said nose collar has finger receiving pockets for enabling one to grasp said nose collar and move said nose collar axially of sad central bore.

21. The chuck assembly of claim 15 combined with a tool or tool holder having a mating drive structure on a shank thereof.

22. The chuck assembly and tool or tool holder of claim 21 wherein said shank of said tool or tool holder has an annular groove therein for receiving said at least one detent for holding said shank of said tool or tool holder against axial movement.

23. The chuck assembly of claim 15 combined with a tool or tool holder having a polygonal drive structure on a shank thereof for mating with a polygonal drive structure in said central bore.

24. The chuck assembly of claim 15 combined with a tool or tool holder having a spline drive structure on a shank thereof at an inner end of said shank for mating with a spline drive structure in said central bore.

25. A chuck assembly comprising:
a chuck body having an outer end portion, an outer periphery and a central bore extending at least partially through said chuck body along a central axis;
said chuck body further having three, substantially equidistantly spaced, generally axially extending, jaw receiving slots which open onto said central bore
mounting means for mounting said chuck assembly onto the outer end of a shaft of a drive mechanism;
three axially and radially movable jaws received in respective ones of said axially extending slots;
moving means for moving said jaws against the shank of a tool or tool holder received in said central bore;

and polygonal drive structure in said central bore for engaging with mating polygonal drive structure on the shank of a tool or tool holder or other accessory received in said central bore of said chuck body;

whereby said chuck assembly can impart a rotary drive to the tool or tool holder or other accessory by one of engagement of said jaws with the shank of a tool or tool holder or other accessory or by engagement of said polygonal drive structure with mating drive structure on a tool or tool holder or other accessory having such mating polygonal drive structure thereon.

26. An elongate rod shaped, non-impact and non percussion drilling, rotary tool comprising a shank, a non-impact and non-percussion drilling, rotary tool or implement formation at an outer end of said shank, a portion, other than an inner end, of said shank having a hexagonal cross section, an annular groove in said shank which is only wide enough to receive a detent to prevent axial movement of said tool when it is received in a snap-in-chuck assembly and a spline formation at an inner end of said shank.

27. The tool of claim 26 wherein said annular groove is located in said portion having said hexagonal cross section.

28. The tool of claim 26 wherein said tool formation of said tool is selected from the group comprising: a drill bit, a screwdriver, and a Phillips screwdriver.

29. The tool of claim 26 wherein said inner end of said shank having said spline formation has a smaller diameter than the diameter of said shank.

* * * * *